United States Patent [19]

Jones

[11] 4,007,714
[45] Feb. 15, 1977

[54] SPARK PLUG AND ROTARY ENGINE COMBINATION

[75] Inventor: Charles Jones, Hillsdale, N.J.

[73] Assignee: Curtiss-Wright Corporation, Wood-Ridge, N.J.

[22] Filed: Oct. 14, 1975

[21] Appl. No.: 622,124

[52] U.S. Cl. ............................ 123/8.09; 123/169 R
[51] Int. Cl.² ................... F02B 53/12; F02P 13/00
[58] Field of Search .......... 123/8.09, 169 R–169 V; 313/118, 144

[56] References Cited

UNITED STATES PATENTS

| | | | |
|---|---|---|---|
| 3,739,753 | 6/1973 | Burley et al. | 123/169 EL X |
| 3,831,562 | 8/1974 | Paxton et al. | 123/8.09 |
| 3,855,972 | 12/1974 | Roberts | 123/8.09 |
| 3,897,759 | 8/1975 | Sasaki et al. | 123/8.09 |

FOREIGN PATENTS OR APPLICATIONS 1,186,684   2/1965   Germany ................. 123/169 EC Primary Examiner—Carlton R. Croyle
Assistant Examiner—Michael Koczo, Jr.
Attorney, Agent, or Firm—Arthur Frederick; Victor D. Behn

[57] ABSTRACT

The improved combination of a rotary internal combustion engine and spark plug provides a bore in the engine housing extending from the exterior of the housing into communication with the rotor cavity defined by the housing. The bore has a threaded portion to receive the threaded shank portion of the spark plug and an annular shoulder extending in a plane substantially normal to the longitudinal axis of the bore. The spark plug has a complementary annular shoulder portion extending in a plane substantially parallel to the plane of the shoulder of the bore. The shoulder portion of the spark plug is so located as to engage the shoulder of the bore to thereby position the spark gap end of the spark plug relative to the rotor cavity. An annular channel means is provided adjacent the shoulder of the bore to provide an annular space into which is placed a gasket to prevent fluid leakage through the interstices between the bore and spark plug.

5 Claims, 4 Drawing Figures

SPARK PLUG AND ROTARY ENGINE COMBINATION

The invention relates to rotary internal combustion engines and, more particularly, to an improved combination of rotary internal combustion engine and spark plug.

It is well known that it is desirable in rotary internal combustion engines, particularly of the Wankel type such as disclosed in the Wankel et al, U.S. Pat. No. 2,988,065, to provide as small a cavity at the spark plug as possible to thereby minimize blow-by (gas leakage) and lubricant accumulation which may foul the spark plug. To achieve this end, the spark plug end portion of the spark plug must be located as close as possible to the rotor cavity of the engine housing without being in the cavity and the path of the rotor apex seals. This requirement for precisely locating the spark plug in the housing relative to the rotor cavity proved difficult because of the use of deformable or crushable type seals to provide a gas-tight seal between the spark plug and the bore in the housing into which the spark plug is turned. One solution to the problem is disclosed in the Paxton et al, U.S. Pat. No. 3,831,562 wherein frustoconical mating surfaces are provided on the spark plug and in its bore. While this combination provides metal-to-metal abutment for the precise location of the insertion depth of the spark plug in its associated bore, it has the disadvantage of producing self-centering stresses in the housing, which stresses are relatively serious matters when the housing is of aluminum.

It is therefore the object of this invention to provide an improved combination of rotary internal combustion engine and spark plug wherein precise location of the spark plug in its bore is achieved without creating self-centering stresses and wherein the interstices between the spark plug and its bore are sealed against gas leakage.

SUMMARY OF INVENTION

It is, therefore, contemplated by the present invention to provide an improved combination of rotary internal combustion engine and spark plug which comprises a rotary internal combustion engine having a housing defining a cavity which may be of trochoidal shape and within which is supported a rotor for rotative movement relative to the housing. The rotor has a profile such that the peripheral surfaces of the rotor define with the housing a plurality of working chambers each of which successively expands and contracts in volumetric size as the rotor rotates relative to the housing. The spark plug of the combination has a spark gap end portion and an electrical terminal opposite end portion and a threaded shank portion between those end portions. A bore is provided in the housing which extends from the exterior of the housing into communication with the housing cavity. The bore has a threaded portion to receive the threaded shank portion of the spark plug and has a first abutment means extending in a plane substantially normal to the longitudinal axis of the bore. The spark plug is also provided with a second abutment means which extends in a plane substantially parallel to the plane of said first abutment means. The second abutment means is axially located on the spark plug so that it contacts the first abutment means and thereby positions the spark gap end portion of the spark plug in a predetermined relationship with the housing cavity. To insure prevention of gas leakage through the interstices between the spark plug and the walls defining the bore, a channel means is located in the bore adjacent the first abutment means so that a space or recess is defined between the second abutment means of the spark plug and the bore. A seal means, such as a deformable or crushable gasket, is disposed in the space and is sealingly deformed in the space by the spark plug before the first and second abutment means comes into engagement.

In a narrower aspect of the invention, the first and second abutment means are each annular shoulders and the channel means is an annular recess to receive an annular gasket.

In one embodiment of the invention the gasket recess or space has a generally rectangular shape in cross-section whereas, in another embodiment, the recess or space has a triangular shape in cross-section.

BRIEF DESCRIPTION OF THE DRAWINGS

The invention will be more fully understood from the following description when considered in connection with the accompanying drawings in which.

DESCRIPTION OF THE PREFERRED EMBODIMENTS

Figure 2:
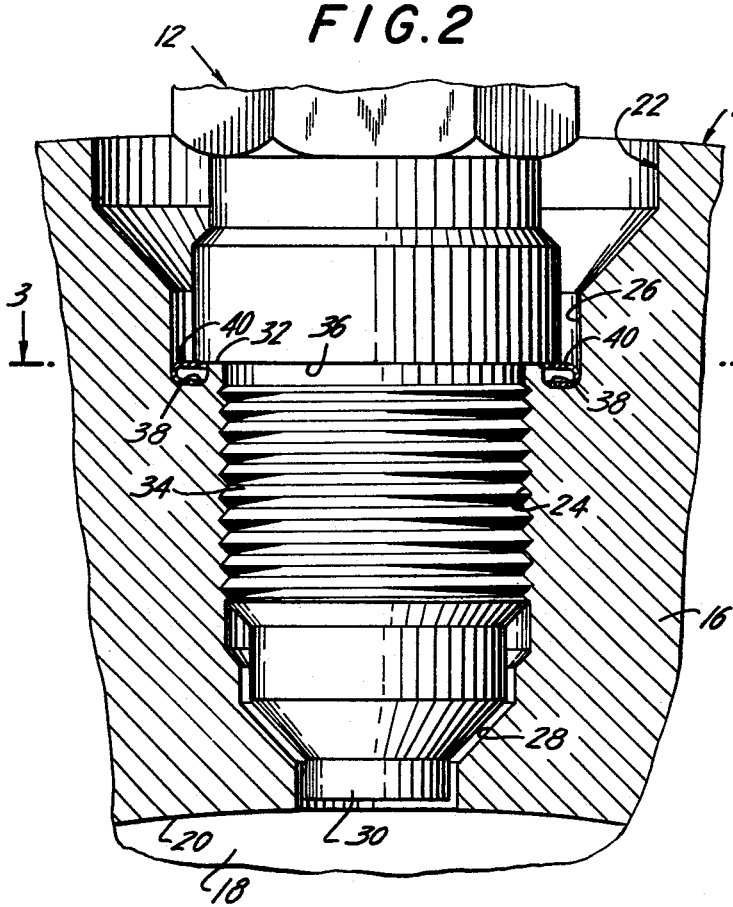
FIG. 2 is a fragmentary cross-sectional view, similar to FIG. 1 but on an enlarged scale.
Figure 3:
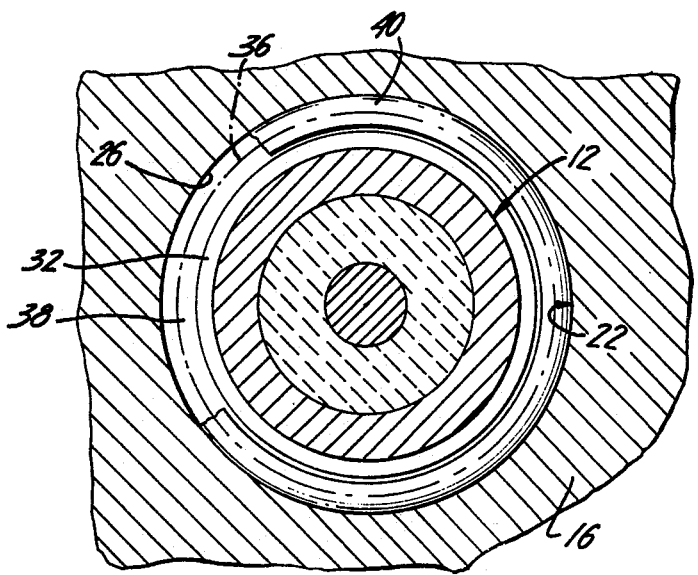
FIG. 3 is a cross-sectional view taken substantially along line 3—3 of FIG. 2.
Figure 1:
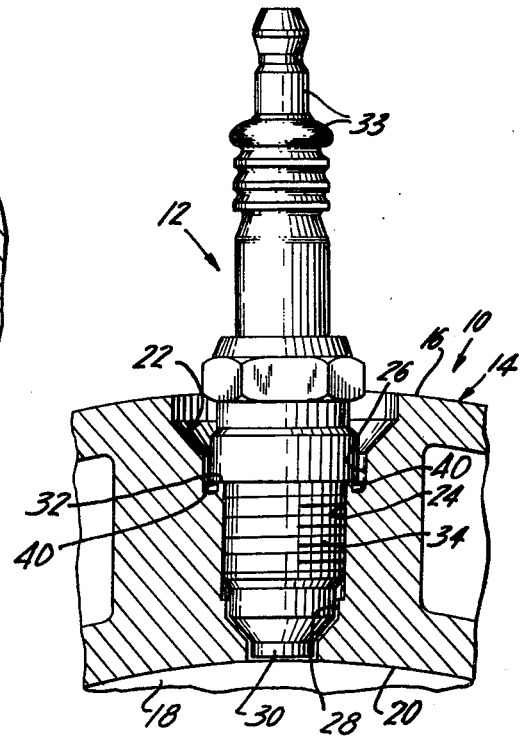
FIG. 1 is a fragmentary view in cross-section of the improved combination of rotary internal combustion engine and spark plug according to a first embodiment of this invention.

Now referring to the drawings and, more particularly, to FIGS. 1 to 3, the reference number 10 generally designates the rotary internal combustion engine which may be of the Wankel type while 12 generally denotes the spark plug according to this invention.

The rotary internal combustion engine has a housing 14, the walls of which, including a peripheral wall 16, define a cavity 18 within which a rotor (not shown) is supported for rotation relative to housing 14. The rotor has a peripheral or flank surface (not shown) which defines with the housing a plurality of working chambers (not shown) which expand and contract in volumetric size as the rotor rotates within cavity 18. The inner surface 20 of peripheral wall 18 may have a trochoidal configuration such as in the Wankel engines disclosed in the Wankel et al, U.S. Pat. No. 2,988,065. Also, the rotor is provided with seals (not shown) which are carried by the rotor along the surface 20 of peripheral wall 18 to assist other seals (not shown) in sealing one working chamber (not shown) from another working chamber (not shown). A bore 22 is provided in peripheral wall 16 to receive spark plug 12, the latter functioning to ignite a fuel mixture compressed in the working chambers (not shown) of rotary internal combustion engine 10.

In accordance with this invention, bore 22 extends from the exterior surface of the peripheral wall 16 and, through inner surface 20, into communication with cavity 18. The bore 22 has a threaded portion 24 disposed between a counter-bored portion 26 and an inner portion 28 having a contour substantially complementary to the spark gap end portion 30 of spark plug 12 when the latter is inserted to its fullest extent in bore 22, as will be more fully explained hereinafter. As best shown in FIG. 2, bore 22 also has an abutment means 32 which extends in a plane substantially normal to the longitudinal axis of bore 22. The abutment means is preferably an annular shoulder located adjacent the threaded portion 24, the purpose of which will be explained hereinafter.

The spark plug 12, in addition to spark gap end portion 30, has an electrical terminal end portion 33 and a threaded shank portion 34 in the spark plug shell corresponding to the threaded portion 24 of bore 22. Adjacent threaded portion 34, the shell of spark plug 12 has also an abutment means 36 complementary to abutment means or shoulder 32 of bore 22 and extending in a plane substantially parallel to the plane of shoulder 32. Preferably, abutment means 36 is an annular shoulder formed by a diametrically enlarged portion of the shell of the spark plug. While the spark plug 12 has been illustrated as a surface spark gap type such as disclosed in the Paxton et al, U.S. Pat. No. 3,831,562, it is to be understood that the invention is not limited thereto. The spark plug 12 may be of any suitable internal and external construction providing it is provided with an annular shoulder 36 and a threaded shank portion 34 according to this invention.

Figure 4:
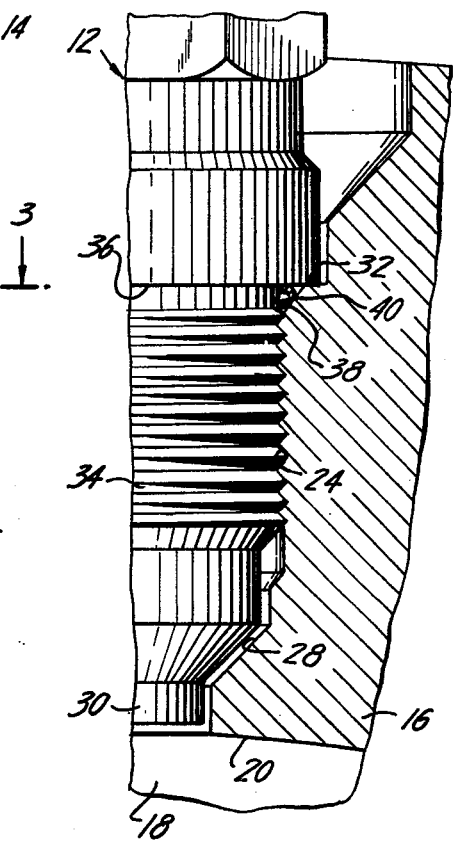
FIG. 4 is a fragmentary view similar to FIG. 2 showing another embodiment of this invention.

Also, in accordance with this invention, the improved combination of rotary internal combustion engine and spark plug includes a recess means 38 formed in bore 22 adjacent abutment means or shoulder 32. The recess means 38 is preferably an annular-shaped channel formed adjacent and substantially concentric with shoulder 32. The channel or recess means 38 defines a somewhat rectangular shaped space in cross-section and dimensioned to receive a sealing means 40. The sealing means 40 is preferably a deformable or crushable ring-shaped gasket. The sealing means or gasket 40 functions to prevent fluid leakage through the interstices between bore 22 and spark plug 12. Alternatively, as shown in FIG. 4, the recess means 38 may be somewhat triangular in cross-section and located radially inwardly of shoulder 32 rather than rectangularly shaped and located radially outwardly of shoulder 32 as is illustrated in FIGS. 1 and 2.

In assembling spark plug 12 in bore 22, the sealing means or gasket 40 is first placed in channel 38 (recess means). Thereafter, spark plug 12 is turned in bore 22 in the usual manner well known in the art to thereby turn threaded shank portion 34 into meshing relationship with threaded portion 24 of bore 22. With the shoulders 32 and 36 in abutment, the spark gap end portion 30 of spark plug 12 is positioned in the location relative to cavity 18 where spark gap end portion is not within cavity 18 and yet is in very close proximity to cavity 18 so as to minimize the size of the blow-by chamber defined between the end of the spark plug and cavity 18. At a point shortly before the abutment of shoulders 32 and 36, shoulder 36 engages gasket 40 and, with the continued turning of spark plug 12, compresses and deforms or crushes gasket 40 so that it sealingly contacts the surfaces of channel 38 and shoulder 36 and thus seals the interstices between the spark plug and bore 22 against fluid leakage.

It is believed now readily apparent that the improved combination of rotary internal combustion engine and spark plug provides for precise location of the spark plug within its associated housing bore without creating self-centering stresses and at the same time provides a fluid tight seal of the interstices between the spark plug and its bore.

Although two embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:
1. An improved combination of a rotary internal combustion engine, having a housing defining a cavity within which a rotor is supported for rotative movement relative to the housing and defining with the housing a plurality of working chambers which successively expand and contract in volumetric size as the rotor rotates, and a spark plug having a threaded shank portion and a spark gap end portion and an electrical terminal opposite end portion, the improved combination comprising:
   a. a bore in said housing extending from the exterior of the housing into communication with the housing cavity;
   b. said bore having a threaded portion to receive the threaded shank portion of the spark plug and having a first abutment means extending in a plane substantially normal to the longitudinal axis of the bore;
   c. said spark plug having a second abutment means extending in a plane substantially parallel to the plane of said first abutment means and so located as to engage said first abutment means and thereby position the spark gap end portion of the spark plug in a predetermined relationship to the housing cavity;
   d. a channel means adjacent said first abutment means to define with the second abutment means a space; and
   e. a seal means disposed in said space to engage in fluid tight relationship said second abutment and channel means when the first and second abutment means are engaged and thereby prevent gas leakage through the interstices between the spark plug and the bore.

2. The combination of claim 1 wherein said first abutment means and second abutment means are each annular shoulders.

3. The combination of claim 2 wherein said seal means is a ring shaped gasket of such dimensions as to be deformable in said space by the spark plug before the latter's annual shoulder abuts the annular shoulder of the bore.

4. The combination of claim 2 wherein said spark plug is of the surface gap type.

5. The combination of claim 1 wherein the engine housing comprises a peripheral wall surface of trochoidal shape.

* * * * *